United States Patent [19]

Chen

[11] 4,076,904
[45] Feb. 28, 1978

[54] SOLID STATE PHOTOGALVANIC DEVICE UTILIZING SEA WATER AS AN ELECTROLYTE

[75] Inventor: Schoen-nan Chen, North Brunswick, N.J.

[73] Assignees: Optel Corporation, Princeton, N.J.; Grumman Aerospace Corporation, Bethpage, N.Y.

[21] Appl. No.: 740,873

[22] Filed: Nov. 11, 1976

[51] Int. Cl.² ............................................... H01M 6/30
[52] U.S. Cl. ...................................... 429/111; 429/119
[58] Field of Search ............................. 429/111, 119; 136/89 NB, 89 TF

[56] References Cited

U.S. PATENT DOCUMENTS

| | | | |
|---|---|---|---|
| 3,925,212 | 12/1975 | Tchernev | 250/527 |
| 4,011,149 | 3/1977 | Nozik | 204/129 |

*Primary Examiner*—John H. Mack
*Assistant Examiner*—Aaron Weisstuch
*Attorney, Agent, or Firm*—Morris Liss

[57] ABSTRACT

A multilayer device has a coated photoelectrochemical electrode and a counterelectrode. The device is packaged without an electrolyte. However, when the device is immersed in sea water, the water acts as an electrolyte by contributing ions which makes photogalvanic action possible. The device may be fabricated in the form of flexible sheets which are easily transported and deployed for use in sea water. The device will generate electricity for a utilization device after it is immersed in sea water and exposed to light.

6 Claims, 3 Drawing Figures

SOLID STATE PHOTOGALVANIC DEVICE UTILIZING SEA WATER AS AN ELECTROLYTE

FIELD OF THE INVENTION

The present invention relates to a photogalvanic device and more particularly to such a device which is solid state and contains no electrolyte. Instead, it relies upon immersion into an electrolytic medium such as sea water.

BRIEF DESCRIPTION OF THE PRIOR ART

The prior art is replete with batteries which utilize sea water as an electrolyte. In this manner, the battery may be stored until it must be used in the environment of the sea. Although many of these devices operate satisfactorily, such as the Adams Battery, their relatively large size limits their usefulness. Certainly, many of these devices are impossible to carry on one's person for applications including emergency use. In a co-pending application Ser. No. 763,073 filed Jan. 27, 1977, to the present assignee, entitled "THIN FILM PHOTOGALVANIC CELL" by Horst Witzke, et al., in a second embodiment, a photogalvanic cell is disclosed, which includes semiconductor films that generate electrical energy from light energy at a photoactive junction. However, this device requires a sealed liquid electrolyte. Further, the referenced device does not take the form of a flexible sheet-like material that may be rolled up as is a desirable feature in one of the embodiments of the present invention.

BRIEF DESCRIPTION OF THE PRESENT INVENTION

The present invention is an entirely solid state device when fabricated and relies upon electrolytic medium into which the device is immersed, such as sea water. By virtue of the structure disclosed herein, a large area photogalvanic cell is possible which is especially useful in sea water. Before immersion, the device is inactive. However, once it is deployed into the electrolytic medium, light energy is quickly converted into useful electrical energy. The presently disclosed device can be manufactured in a relatively thin form and as long as it is immersed in sea water or another medium with sufficient ions, the device can generate electricity to power a utilization device. Further, since the device does not include an encapsulation window as in many other prior art photogalvanic devices, there is no filter effect to lessen the photogalvanic conversion. That is, ultraviolet rays can reach the photoactive surface without undergoing optical filtering through a window. Further, since one embodiment of the invention is fabricated in the form of a flexible sheet, it can be rolled up so that a large photoactive area can be stored or transported in a relatively small volume.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
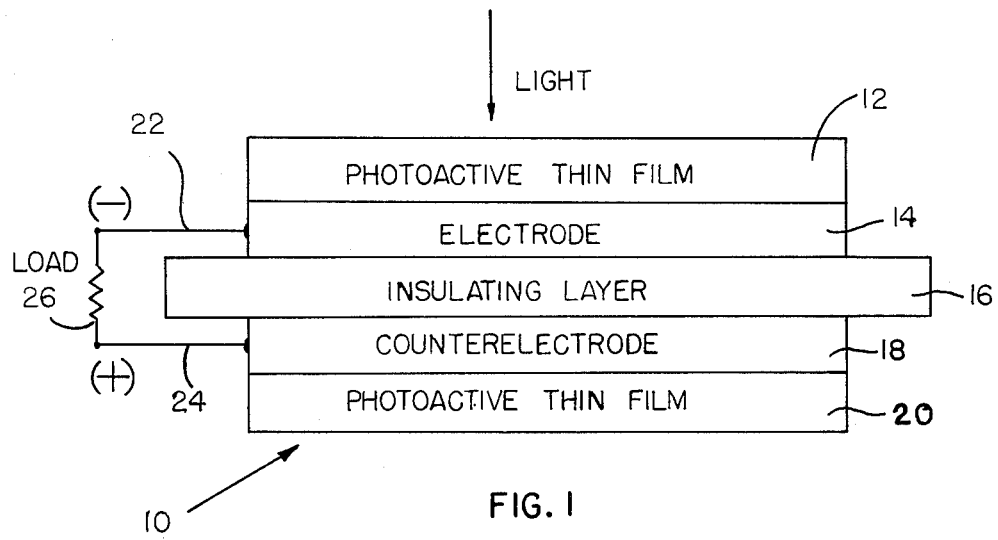
FIG. 1 is a diagrammatic cross sectional view of a first embodiment of the invention wherein multiple photoactive thin films are employed.

Referring to the figures, and more particularly FIG. 1 thereof, a first embodiment of the present invention is generally indicated by reference numeral 10. The device illustrated includes a light passing photoactive thin film 12 which may include known photoactive substances such as $TiO_2$, CdS and GaP. A second thin film serving as an electrode 14 is made from a known conducting material such as $SnO_2$. The electrode 14 is necessary to conduct electron flow from the device as it is produced. An insulating layer 16 is positioned below the electrode 14 and serves to electrically insulate the electrode 14 from a subsequent counterelectrode 18 that is positioned on the side of the insulating layer 16 opposite from the electrode 14. In the embodiment shown in FIG. 1, the insulating layer 16 must pass light to a subsequent photoactive thin film 20 which is positioned beneath the counterelectrode 18. The insulating layer 16 may be fabricated from a plastic sheet material to permit flexing of the device 10. The counterelectrode 18 may be made from an identical material as electrode 14 while the photoactive thin film 20 may be of an opposite type to that of 12. Leads 22 and 24 are respectively connected to electrode 14 and counterelectrode 18, these leads being connected across a load 26 so that electrical power is provided to the load when the device 10 is exposed to light in sea water as shown.

Figure 2:
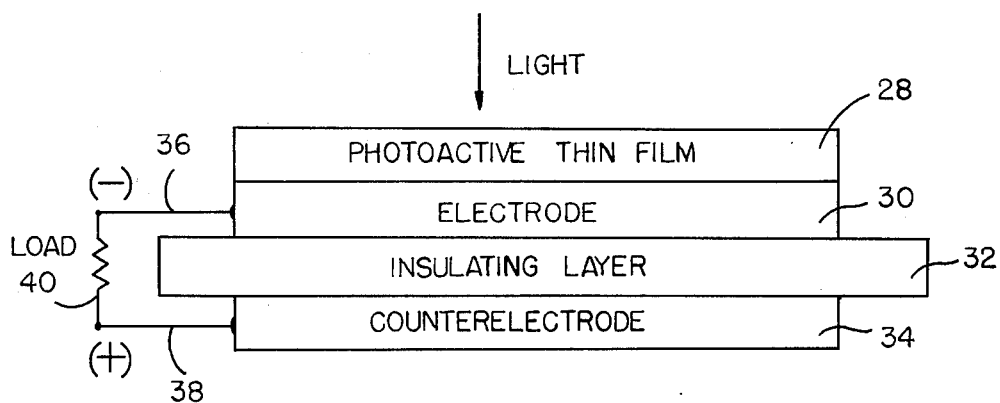
FIG. 2 is a diagrammatic cross sectional view of a second embodiment of the present invention wherein a single photoactive thin film is included.

FIG. 2 illustrates a second embodiment of the invention which is a simplification of the structure shown in FIG. 1. The lower photoactive thin film 20, shown in FIG. 1, is absent. The photoactive thin film 28 and the electrode 30 would correspond with the respective film 12 and electrode 14 of FIG. 1. Insulating layer 32 could be of the same material previously mentioned in connection with layer 16 of FIG. 1. The counterelectrode 34 may be in the form of a carbon layer or a platinized carbon layer, the latter achieving a beneficial catalytic effect on the carbon. Wires 36 and 38 are respectively connected between electrode 30 and counterelectrode 34 to permit a connected load 40 to draw power from the cell.

The advantage of the embodiment shown in FIG. 1 resides in the dual photoactive thin film structure which increases the photoconversion capability of the cell for a particular length of structure. However, it is necessary for the insulating layer 16 as well as the electrode 14 and counterelectrode 18 to permit light to pass to the lower photoactive thin film 20.

The advantage of the second embodiment shown in FIG. 2 resides in the simplified structure which results in lower fabrication costs. A choice of embodiment depends upon particular applications and cost considerations. It should be mentioned that if $TiO_2$ is used for an electrode or counterelectrode, it may be in the conventional rutile form or in the more photoactive anatase form.

In the fabrication of the embodiment shown in FIG. 1 and FIG. 2, the insulating layer forms a central substrate whereon the electrode and counterelectrode layers may be deposited by conventional techniques including sputtering or vapor deposition or by using metalizing techniques, particularly when the insulating layer is plastic. Where the insulating layer may be inflexible glass, conventional Nesa glass may be employed which also includes a light transparent conductive layer that may serve as electrode 14 (FIG. 1) or 30 (FIG. 2). The photoactive thin film layers 12, 20 (FIG. 1) and 28 (FIG. 2) may be applied to the electrode and counter-electrode by the mentioned conventional deposition techniques including sputtering and vapor deposition.

In the event that the embodiment of FIG. 1 is utilized, the photoactive thin film semiconductor material used in film 12 must be of the opposite type from that used in film 20. This is to ensure that electron-hole pairs are produced in accordance with well recognized semiconductor physics principles.

Figure 3:
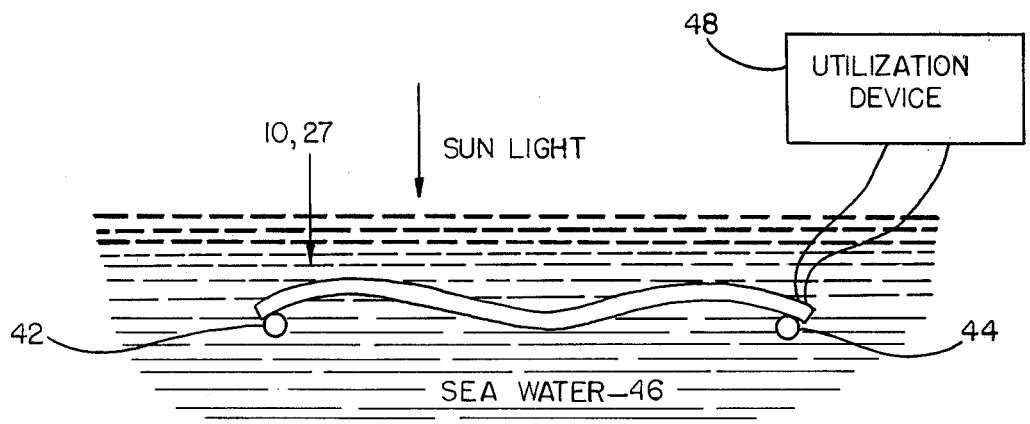
FIG. 3 is a diagrammatic representation of the deployment of the present invention in a sea water environment.

FIG. 3 pictorially illustrates the deployment of the present invention in sea water 46. Particularly, a flexible form of either embodiment is unrolled and immersed into a surrounding electrolyte medium such as sea water. Floats 42 and 44 are attached to the device so that it may be positioned toward the surface of the water body where maximum light impingement occurs. A utilization device 48 is connected to the wires leading from the photogalvanic device. It is to be understood that the utilization device 48 does not form a part of the present invention and is merely indicated for illustrative purposes. The various layers of the invention are seated in juxtaposition with each other but their periphery is exposed to the sea water where electrolytic action takes place. Although sea water is explained in connection with the present invention, it is to be understood that any appropriate ion contributing electrolyte may be used.

It should be further understood that the invention is not limited to the exact details of construction shown and described herein for obvious modifications will occur to persons skilled in the art.

I claim the following:

1. An unenclosed photogalvanic cell comprising:
   a first electrode;
   a second electrode spaced from the first;
   an insulating layer having opposite surfaces upon which the first and second electrodes are deposited, the insulating layer preventing electrical shorting of the electrodes;
   a photoactive thin film outwardly deposited on the first electrode and capable of converting light energy to electrical energy;
   means connected to the electrodes for transferring current from the cell as current becomes available;
   the photoactive thin film adapted to be in contact with a surrounding fluid electrolyte when the cell is immersed therein thus creating a photoactive interface between the photoactive thin film and the electrolyte which enables conversion of light to electrical energy when light impinges upon the photoactive thin film.

2. The subject matter set forth in claim 1 wherein the insulating layer is fabricated from a stiff material to retain the cell as a rigid body.

3. The subject matter set forth in claim 1 wherein the insulating layer is fabricated from a flexible material permitting the cell to be rolled.

4. An unenclosed photogalvanic cell comprising:
   a first electrode;
   a second electrode spaced from the first;
   an insulating layer having opposite surfaces upon which the first and second electrodes are deposited, the insulating layer preventing electrical shorting of the electrodes;
   a photoactive thin film outwardly deposited on the first electrode and capable of converting light energy to electrical energy;
   means connected to the electrodes for transferring current from the cell as current becomes available;
   the photoactive thin film adapted to be in contact with a surrounding fluid electrolyte when the cell is immersed therein thus creating a photoactive interface between the photoactive thin film and the electrolyte which enables conversion of light to electrical energy when light impinges upon the photoactive thin film;
   wherein the photoactive thin film, electrodes and insulating layer pass light therethrough and further wherein a second photoactive thin film is outwardly deposited on the second electrode for increasing the conversion capability of the cell;
   wherein the insulating layer is fabricated from a flexible material permitting the cell to be rolled.

5. A solid state photogalvanic cell for generating electricity when deployed in a water body having dissolved ions therein, the cell comprising:
   a first electrode;
   a second electrode spaced from the first;
   an insulating layer having opposite surfaces upon which the first and second electrodes are deposited, the insulating layer preventing electrical shorting of the electrodes;
   a photoactive thin film outwardly deposited on the first electrode and capable of converting light energy to electrical energy;
   means connected to the electrodes for transferring current from the cell as it becomes available;
   the peripheral edges of the photoactive thin film adapted to be in contact with an electrolytic water body when the cell is immersed therein thus creating a photoactive interface between the photoactive thin film and the water which enables conversion of light to electrical energy when light impinges upon the photoactive thin film.

6. The subject matter of claim 5 wherein the insulating layer is fabricated from a flexible material permitting the cell to be rolled.